United States Patent
Kramp et al.

(10) Patent No.: US 10,698,708 B2
(45) Date of Patent: Jun. 30, 2020

(54) OPTIMIZING JUST-IN-TIME COMPILATION IN A NETWORK OF NODES

(75) Inventors: Thorsten Kramp, Zurich (CH); Tamas Visegrady, Zurich (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 798 days.

(21) Appl. No.: 12/849,122

(22) Filed: Aug. 3, 2010

(65) Prior Publication Data

US 2011/0035735 A1   Feb. 10, 2011

(30) Foreign Application Priority Data

Aug. 4, 2009 (EP) ........................... 09167198

(51) Int. Cl.
*G06F 9/455* (2018.01)

(52) U.S. Cl.
CPC .................. *G06F 9/4552* (2013.01)

(58) Field of Classification Search
CPC ................. G06F 9/4552; H04L 67/10
USPC ......................................................... 717/148
See application file for complete search history.

(56) References Cited

U.S. PATENT DOCUMENTS

| | | | | |
|---|---|---|---|---|
| 5,630,066 A * | 5/1997 | Gosling | ........................ | 709/221 |
| 6,052,732 A * | 4/2000 | Gosling | ........................ | 709/229 |
| 6,295,643 B1 * | 9/2001 | Brown et al. | ................. | 717/148 |
| 6,324,686 B1 * | 11/2001 | Komatsu et al. | ............. | 717/148 |
| 6,738,967 B1 * | 5/2004 | Radigan | .................... | G06F 8/47 717/146 |
| 6,922,828 B1 * | 7/2005 | Alexander et al. | ........... | 717/144 |
| 7,441,233 B1 * | 10/2008 | Orndorff et al. | ............. | 717/125 |
| 7,788,657 B2 * | 8/2010 | Wannamaker | ........ | G06F 8/4434 717/118 |
| 7,917,502 B2 * | 3/2011 | Cheng et al. | .................. | 707/718 |
| 2003/0084271 A1 * | 5/2003 | Lindwer | ........................ | 712/209 |
| 2005/0015756 A1 * | 1/2005 | Brown et al. | ................. | 717/136 |
| 2005/0193373 A1 * | 9/2005 | Wannamaker et al. | ........ | 717/118 |
| 2010/0115502 A1 * | 5/2010 | Jiva | ..................... | G06F 9/45516 717/148 |

OTHER PUBLICATIONS

Artho C & Biere A (2005). Subroutine Inlining and Bytecode Abstraction to Simplify Static and Dynamic Analysis. Bytecode 2005 Preliminary Version. 1-18.*

T. Suganuma, T. Ogasawara, M. Takeuchi, T. Yasue, M. Kawahito, K. Ishizaki, H. Komatsu, T. Nakatani (2000). Overview of the IBM Java Just-in-Time Compiler. IBM Systems Journal. 39(1): 175-193.*

(Continued)

*Primary Examiner* — Johnna R Loftis
(74) *Attorney, Agent, or Firm* — Tutunjian & Bitetto, P.C.; Kevin Michael Jordan

(57) ABSTRACT

A bytecode construction, a method, and a system for optimizing just in time compilation. The bytecode includes several regions wherein a region is a logical sequence of one or more bytecode blocks and the bytecode is annotated with region hints embedded therein. The region hints have a bytecode structure and are designed for instructing a just-in-time, or JIT, runtime environment for JIT compilation of the regions by JIT compilers implemented at nodes of a network. A method and a system for implementing the bytecode construction are also presented.

16 Claims, 5 Drawing Sheets

(56) References Cited

OTHER PUBLICATIONS

T. Suganuma, T. Ogasawara, K. Kawachiya, M. Takeuchi, K. Ishizaki, A. Koseki, T. Inagaki, T. Yasue, M. Kawahito, T. Onodera, H. Komatsu, T. Nakatani (2004). Evolution of a Java just-in-time compiler for IA-32 platforms. IBM J. Res. & Dev. vol. 48 No. 5/6 Sep./Nov. 2004. 767-795.*

Byung-Sun Yang, Soo-Mook Moon, Seongbae Parky, Junpyo Lee, Seungll Lee, Jinpyo Park, Yoo C. Chung, Suhyun Kim (1999). LaTTe: A Java VM Just-in-Time Compiler with Fast and Efficient Register Allocation. in Proc. 1999 Int. Conf. Parallel Architectures and Compilation Techniques. 128-138.*

Azevedo A, Nicolau A and Hummel J (1999). Java Annotation-Aware Just-In-Time (AJIT) Compilation System. JAVA '99 ACM. 142-151.*

Lattner, C.; Adve, V., "LLVM: a compilation framework for lifelong program analysis & transformation," Code Generation and Optimization, 2004. CGO 2004. International Symposium on code generation and optimization. Mar. 2004. vol., no., pp. 75-86.*

Whaley, John. "Partial method compilation using dynamic profile information." ACM SIGPLAN Notices. vol. 36. No. 11. ACM, 2001.*

Yasue et al., (2004). Structural Path Profiling: An Efficient Online Path Profiling Framework for Just-In-Time Compilers. Journal of Instruction-Level Parallelism. Apr. 2004. 6: 1-28.*

Suganuma et al., (2004). Evolution of a Java just-in-time compiler for IA-32 platforms. IBM J. Res. & Dev. vol. 48 No. 5/6 Sep./Nov. 2004. 767-795.*

Suganuma et al., (2005). Design and evaluation of dynamic optimizations for a Java just-in-time compiler. ACM Transactions on Programming Languages and Systems (TOPLAS). vol. 27 Issue 4, Jul. 2005. pp. 732-785.*

Toshio Suganuma, Toshiaki Yasue, Toshio Nakatani (2006). A region-based compilation technique for dynamic compilers. Jan. 2006 Transactions on Programming Languages and Systems (TOPLAS), vol. 28 Issue 1.*

Arnold et al., (2005). Improving Virtual Machine Performance Using a CrossRun Profile Repository. OOPSLA'05, Oct. 16-20, 2005, ACM. pp. 297-311.*

Badea, Carmen; Nicolau, Alexandru; Veidenbaum, Alexander V. A Simplified Java Bytecode Compilation System for Resource-Constrained Embedded Processors_2007.*

Hummel, Joseph; Azevedo, Ana; Kolson, David; Nicolau, Alexandru. Annotating the Java Bytecodes in Support of Optimization. Apr. 1997.*

G. V. Yee, B. Shucker, J. Dunn, A. Sheth, and R. Han, Just-in-time sensor networks, Third Workshop on Embedded Networked Sensors (EmNets 2006), May 2006.

* cited by examiner

```
        hint:JIT region
L000f:    ldc.0              ;; outer loop      (similar to R1 in FIG. 2A)
          st.0 hint:JIT region
L0016:    ld.1               ;; inner loop      (similar to R2)
          ld.0
          ldc.2
          add
          shl
          ...
          add
          ld.2 hint:backwards jump
          blt      L0016     ;; conditional jump, back to inner loop (end of loop)
                             ;; (compiler could also find iteration count)

hint:JIT region
          ld.1               ;; remaining code in outer loop   (R3)
          ld.4
          ldc.4
          shl
          add
          ...
          add
          ld.3 hint:backwards jump
          blt      L000f     ;; conditional jump, back to outer loop (end of loop)

ld.1
          ...
          ret.i              ;; code following outer loop
```

FIG. 2C

OPTIMIZING JUST-IN-TIME COMPILATION IN A NETWORK OF NODES

CROSS REFERENCE TO RELATED APPLICATION

This application claims priority under 35 U.S.C. § 119 from European Patent Application No. 09167198.2 filed Aug. 4, 2009, the entire contents of which are incorporated herein by reference.

BACKGROUND OF THE INVENTION

1. Field of the Invention

The invention relates to the field of performance optimization in a network of nodes. More particularly, the invention relates to performance in a network of wireless sensors, wherein nodes have limited resources and implement just-in-time (JIT) or operate in a JIT environment.

2. Description of the Related Art

In networks and computer science, networks of nodes with limited resources such as sensor networks and in particular wireless sensor networks (or WSNs) are known. The latter denote wireless networks of autonomous, spatially distributed sensors that typically monitor physical parameters, such as temperature, pressure or pollutants at different locations. WSNs are nowadays used in various applications, including industrial or environmental monitoring or traffic control. A typical multihop WSN Architecture is depicted in FIG. 1. Sensor nodes (N1, . . . . Nn) are each equipped with a radio transceiver or the like to transmit back to the gateway G or host system for data collection. Data can then be accessed from a personal computer (PC).

In the computer science field, just-in-time (or JIT) compilation, also called dynamic translation is also known. JIT relates to a technique for improving runtime performance of computer programs. It builds upon earlier concepts of runtime environments, namely bytecode compilation and dynamic compilation. It converts bytecode into native code at runtime prior to executing it natively. Hence, operands do not need to be reinterpreted each time they are met, as carried out by virtual machines. In addition, bytecode can be recompiled when necessary, as opposed to static compilation. JIT thus combines advantages of interpretation and static compilation. Several runtime environments, such as Microsoft's CLR (common language runtime) and most implementations of Java rely on JIT compilation.

Research in sensor networks has previously dealt with the ability to adapt to changing conditions, as noted in a paper by G. V. Yee, B. Shucker, J. Dunn, A. Sheth, and R. Han, entitled *Just-in-time sensor networks*, in Third Workshop on Embedded Networked Sensors (EmNets 2006), May 2006. This has resulted in the ability to dynamically change attributes such as routing paths, MAC protocols, program images, and duty cycling. As several sensor network optimizations cannot be accomplished through software changes alone, recent research has strived for more adaptability at the physical level by using automated deployment throughout the lifetime of a network instead of just in the initial phases such as runtime deployment solutions.

Possible optimizations and the adaptability of a sensor network with runtime deployments done in real-time were also considered. A system utilizing JIT deployment was for instance defined in the above paper as one where a heterogeneous set of sensor nodes may be deployed. JIT deployment is a scalability approach, where a relatively small and sparse core network can be extended with additional nodes on demand, thus increasing node density and network coverage.

Today, many embedded devices do not stand isolated but work cooperatively in networks to interact with their environment, such as in sensor networks, especially if connected wirelessly in an ad-hoc fashion. Such networks tend to be heterogeneous with most of nodes limited by scarce resources. Developing applications for such networks is therefore challenging, for the most part requiring programming close to the hardware and maintaining different code bases for all the different nodes used.

Furthermore, dynamically distributing, loading, and deleting applications is virtually impossible without introducing a higher level of abstraction that shields the application from hardware intrinsic. Such a layer of abstraction may be provided by a virtual machine or VM, which basically levels the underlying hardware from an application point of view. Yet, adding a VM interpreting bytecode can have serious impact on the execution performance. JIT compiling all bytecode during load time, or selected bytecode sequences during runtime, however, is generally challenging on embedded devices considering the limited resources available.

SUMMARY OF THE INVENTION

In a first aspect of the invention, a Bytecode construction is presented. The Bytecode construction includes at least one region which is a logical sequence of one or more bytecode blocks; and a region hint embedded in the bytecode, where the region hint contains a bytecode structure and is designed to instruct a just-in-time (JIT) runtime environment for JIT compilation of a region by JIT compilers implemented at nodes of a network.

In another aspect of the invention, a method for optimizing a network of nodes which share a same JIT runtime environment and which independently implement JIT compilers for compiling bytecode is presented. The method includes providing Bytecode code construction which includes: at least one region which is a logical sequence of one or more bytecode blocks; and a region hint embedded in the bytecode, wherein the region hints have a bytecode structure; and are designed for instructing a just-in-time or JIT runtime environment for JIT compilation of the regions by JIT compilers implemented at nodes of a network.

In yet another aspect of the invention, system including a network of nodes which share a common Just In Time (JIT) runtime environment and implement JIT compilers for independently compiling bytecode is presented. The network includes computer program code means configured to implement a method which includes:

providing a bytecode construction which includes: at least one region which is a logical sequence of one or more bytecode blocks; and a region hint embedded in the bytecode, wherein the region hints have a bytecode structure; and are designed for instructing a just-in-time or JIT runtime environment for JIT compilation of the regions by JIT compilers implemented at nodes of a network.

A bytecode construction, a method, and a network of nodes embodying the present invention will now be described, by way of non-limiting examples, and in reference to the accompanying drawings.

BRIEF DESCRIPTION OF THE DRAWINGS

FIG. 2C is a basic example of an assembler version of bytecode having a construction according to an embodiment;

DETAILED DESCRIPTION OF THE INVENTION

Figure 1:
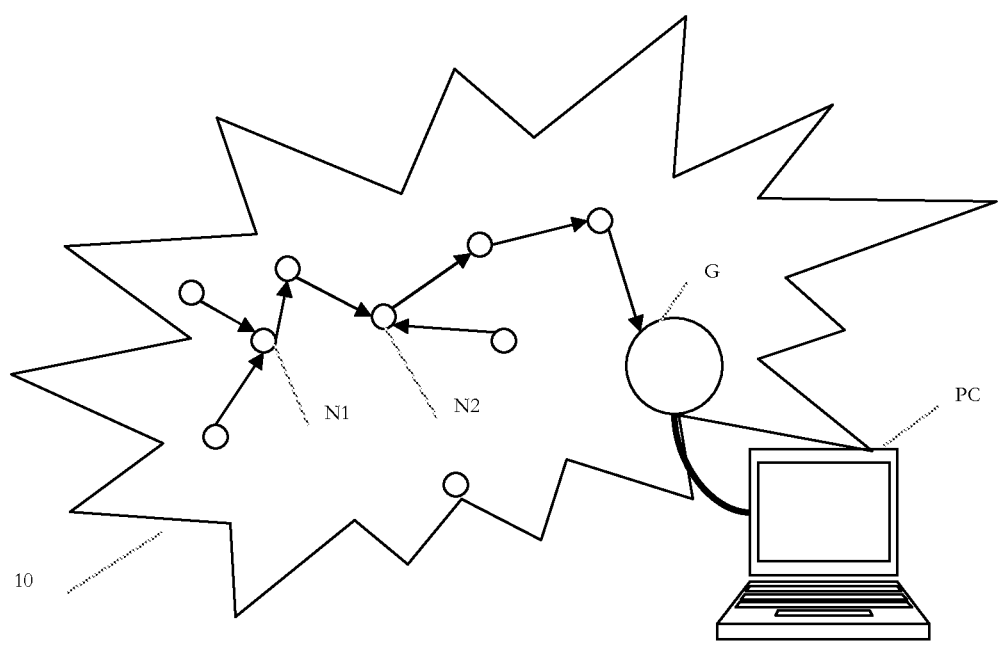
FIG. 1 depicts a typical wireless sensor network structure

The present invention may be embodied as a bytecode construction, wherein: the bytecode construction has several regions, a region being a logical sequence of one or more bytecode blocks; and the bytecode construction has bytecode annotated with region hints embedded therein, wherein the region hints: have a bytecode structure; and are designed for instructing a just-in-time or JIT runtime environment for JIT compilation of the regions by JIT compilers implemented at nodes of a network.

In one embodiment of the invention, the bytecode construction may include one or more of the following features:

the region hints logically precede respective regions with respect to processing by the JIT environment;

each region is such that any forwards jump from each region terminates within the region;

the hints are embedded as non-functional instructions for the JIT compiler, whereby a target node deprived of JIT compilation can ignore the hints;

the bytecode is further annotated with: backwards jump hints, designed to instruct to dispatch backwards jumps through the JIT environment; and preferably jump-target hints, designating an entry point within a given one of the regions; and the bytecode is at most annotated with: one or more region hints, one or more backwards jump hints, and one or more hints of target of jump.

In another embodiment, the present invention embodied as a method for optimizing a network of nodes, the nodes sharing a same JIT runtime environment and independently implementing JIT compilers for compiling bytecode, wherein the method includes providing bytecode having a bytecode construction according to the previous aspect of the invention.

In one embodiment, the bytecode construction may include one or more of the following features:

providing includes: annotating bytecode, preferably offline, with one or more of the hints to obtain the bytecode construction;

the method further includes parsing the annotated bytecode for identifying hints and instructing for compilation of bytecode according to the identified hints;

the hints are further adapted for instructing the JIT runtime environment to collect statistics about the hints, and the method further includes: collecting the statistics at first nodes of the network; migrating data pertaining to the collected statistics from the first nodes to second nodes of the network; and compiling bytecode at the second nodes according to the migrated data;

the first and second nodes share a local network;

the first nodes are instrumentation nodes specifically adapted to implement the collecting of the statistics whereas the second nodes are nodes at which collecting statistics is not implemented; and compiling at the second nodes occurs if an execution profile in the data migrated is found compatible with the second nodes, for example compatible with resource limitations and/or run-time behaviors of the second nodes.

The present invention may also be embodied as a system including a network of nodes sharing a common JIT runtime environment and implementing JIT compilers for independently compiling bytecode, the network includes computer program code means configured for implementing the method according to the previous aspect of the invention. Preferably, the network is an heterogeneous network.

As an introduction to the following description, general aspects of the invention directed to a specific bytecode construction will be introduced. First, although "bytecode" can very well denote only a single instruction, it shall in the following mostly be understood as a sequence of several instructions, suitably designed for execution by a software interpreter or further compilation into native machine code. Here, the bytecode has a specific construction that exhibits several bytecode regions, each of the regions being a logical sequence of one or more bytecode block. A basic bytecode block is known per se: it is a sequence of one or more bytecode that terminates on a forwards jump. The present region definition allows for collapsing several basic blocks into a single JIT region. The sequence of blocks is said to be "logical" inasmuch as the sequence is meant to be processed sequentially at runtime by the JIT environment.

Importantly, the bytecode is annotated with advisory hints. Hints are embedded in the bytecode sequence and have a typical bytecode structure; they allow for instructing the JIT environment with respect to JIT compilation to be performed e.g. at nodes of the network. Compilers are likely implemented independently at the nodes. JIT advisory hints are typically annotated offline, as to be illustrated in details below. The hints are logically arranged with respect to regions. In particular, region hints are embedded which instruct the environment how to compile the regions, it being emphasized that bytecode regions do not necessarily restrict to single bytecode blocks. Still, the regions are typically designed to prohibit looping (and therefore, unbounded native execution times). In addition to allowing forward jumps, the regions may further be entered at different locations, unlike regular basic blocks.

A given bytecode basically includes of an opcode (encoded in n bits), followed by zero, one, or many arguments. The number and nature of the arguments are specific to the respective bytecode. For example: ldc 4711 loads the constant 4711 onto a stack. Here, ldc is the opcode which expects one argument. As said, a block is a sequence of one or more bytecodes that ends with a jump. The jump may be, for example, conditional, may form a loop, may return from a method invocation, or may throw an exception.

A region is a logical sequence of one or more blocks that may include any number of forward jumps (e.g., conditional) and end with a backward jump. As opposed to forwards jumps, a backward jump may jump to the beginning of the region. Again, "logical" means that the blocks do not necessarily have to be sequential in memory but are rather executed sequentially. Finally, a hint can be contemplated as a meta bytecode. That is, its structure is very much the same as that of a bytecode but it is processed not as part of the code but rather instructs the runtime environment how to process some bytecode. In the present case, region hints basically tell the runtime environment which regions may be compiled by a just-in-time compiler. In an embodiment, hints may thereby instruct the runtime environment to collect and gather statistics and actually compile some region.

Accordingly, a basic idea is to rely on bytecode annotated with JIT advisory hints which then can be efficiently interpreted on a resource constrained device.

Figures 2A, 2B:
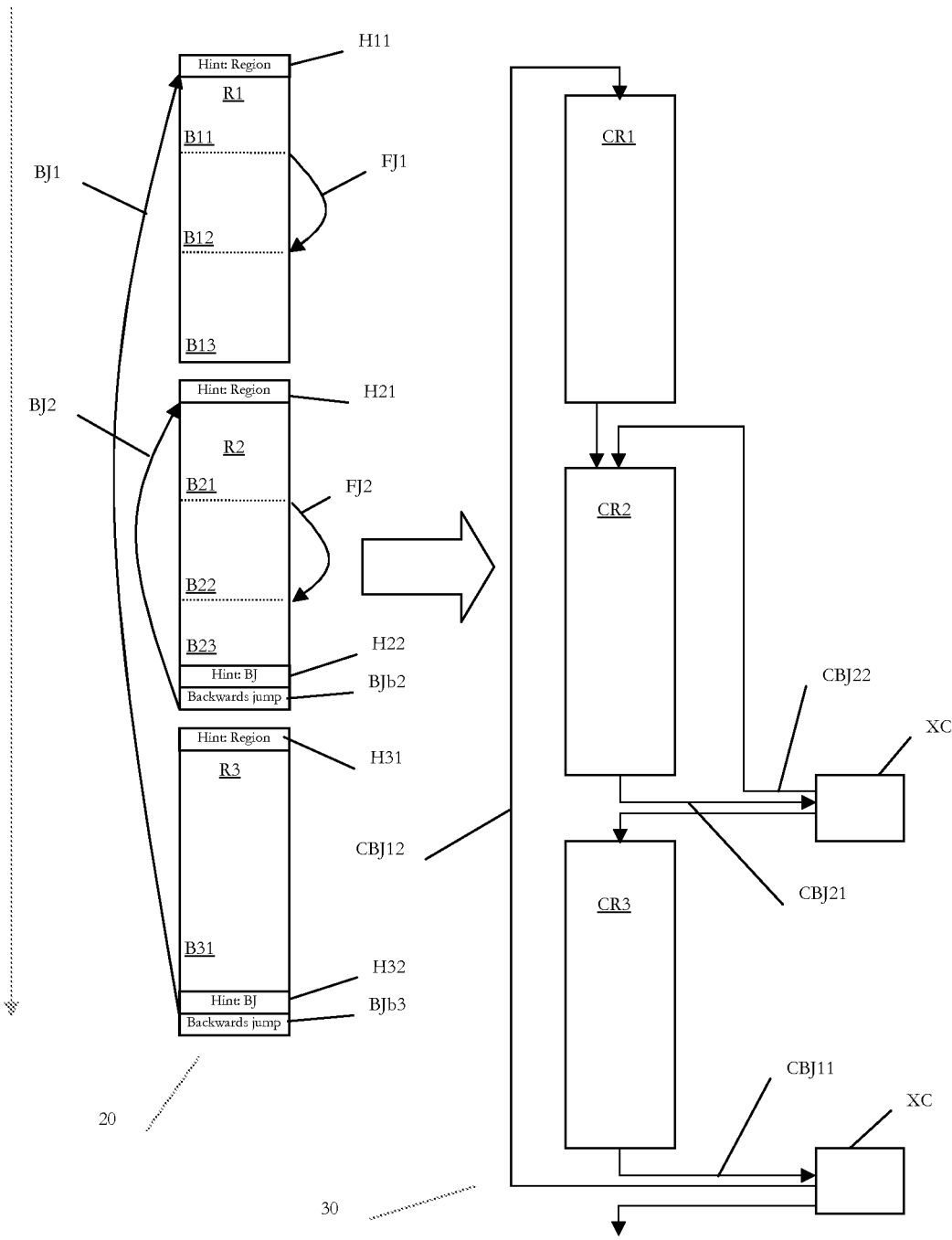
FIG. 2A illustrates a bytecode construction according to an embodiment of the invention.
FIG. 2B shows the how a native code corresponding to the bytecode of FIG. 2A is managed through a JIT environment.

To illustrate the above ideas, an exemplary bytecode construction 10 is shown in FIG. 2A. As shown, the bytecode construction 10 exhibit three regions Rn (n=1, 2, 3). Regions R1 and R2 are each a logical sequence of three bytecode blocks B11, . . . , B23 in this example. As said, "logical" refers to runtime. Region R3 corresponds to a single block B31. More generally, regions correspond to one or more block.

Furthermore, bytecode is here annotated with embedded hints Hnm (n=1, 2, 3; m=1, 2, 3), with n actually corresponding to Rn's. As said above, the hints are designed to instruct the JIT environment for compilation. In this respect, the exact contents of the hints are of little importance, as long as they effectively instruct the environment for compilation.

In the example of FIG. 2A, the hints Hn1 are region hints, advising how to compile bytecode regions. For the sake of illustration only, the hints are represented as portions of their respective regions, wherein the text "Hint: Region" appears. As discussed below, the hints Hn2 pertain to backwards jumps.

In operation, bytecode is parsed for identifying the hints and subsequently instructing how to compile; this shall be exemplified in FIG. 4. Referring back to FIG. 2A, preferably, the region hints Hn1 are prefixed, i.e. they logically precede the regions Rn that they annotate (from the viewpoint of processing by the JIT environment, that is, "logically" again refers to runtime). Accordingly, the JIT environment can compile bytecode regions and verify them going forwards only. In other words, this allows for the JIT environment to process the bytecode in a single-pass.

In this respect, hints may be processed in strict bytecode order, without needing back-references. The prefixed hints allow the JIT to process bytecode regions, e.g. to compile and verify going only forward, knowing what kind of bytecode constructs to expect and for instance discard the compiled form if the bytecode does not match what is expected.

According to a preferred definition of the present regions, a region Rn is such that any forward jumps FJm from the region terminates within the region: this is explicitly illustrated in FIG. 2A, see FJ1 and FJ2 which clearly end in the same region they start from. Here, both FJ1 and FJ2 actually jump from the end of a block to the beginning of another block. Basically, a jump terminates a basic block and a jump target starts one. Note that the grey arrow denotes one potential flow control as viewed from the JIT environment. For instance, for unconditional jumps this is the only flow control, for conditional jumps, not following the jump would be the alternative.

In addition, according to a further preferred definition, either no backwards jump is included, or a backwards jump may be annotated by an advisory hint to dispatch through the JIT environment. In the example of FIG. 2A, backwards jump are annotated by advisory hints Hn2 ("Hint: BJ"), followed by the bytecode corresponding to the backwards jump itself. The bytecode corresponding to the backwards jump itself is denoted by BJbn, where n corresponds to Rn's.

Note that in the representation of FIG. 2A, the areas corresponding to the different regions are slightly separated for the sake of clarity only.

A region hint starts a region of potential interest to a backend JIT compiler. Bytecode starting at the hinted location, of a size (byte or instruction count) likely included within the hint shall preferably be guaranteed to actually comply with both requirements that:

All backwards jump within the region are hinted; and
Forwards jumps terminate within the region.

This double requirement ensures a consistent processing of the regions.

Incidentally, hints are better embedded as non-functional instructions (e.g. "escape codes") into the bytecode for the JIT compiler. Hence, targets without JIT compilation can simply ignore these hints.

Furthermore, and as evoked earlier, bytecode is preferably annotated offline. The offline identification of bytecode sequences suitable for JIT compilation can be done either manually by a programmer (e.g., by annotating the code regions accordingly), or semi-automatically by profiling the application concerned (e.g., in a simulator with realistic data sets). More generally, annotating the bytecode is carried out upstream to obtain a bytecode construction as described herein.

In a particularly efficient implementation, the bytecode is annotated with three types of hints and preferably these three types only. A first type of hint corresponds to the region hints described above: the region hints may specify start and size of respective regions to be compiled. The second type pertains to a backwards jump; the corresponding hints are designed to instruct the JIT environment to dispatch backwards jumps through the JIT environment. Finally, a third type corresponds to hints of target of jump, designating an entry point within a given one of the regions. Interestingly, inventors have realized that such a reduced alphabet suffices to cope with most if not all situations in practice. Yet, each of the type of hints may be implemented independently, depending on circumstances.

The region hints Hn1 and backwards jump hints Hn2 are both represented in FIG. 2A. How the backwards jump hints manifest can be further appreciated by passing from FIG. 2A which represents a bytecode construction to FIG. 2B which depicts a corresponding native code counterpart and how this is managed by the environment.

In reference to FIG. 2B, quite understandably, each region Rn leads to a corresponding compiled block or region CRn. To this aim, any corresponding region hint is duly taken into account by the JIT environment. In addition, since backwards jump hints instruct to dispatch the corresponding jumps through the environment, a backwards jump BJn (see BJ1 or BJ2, FIG. 2A) translates logically into CBJn1 and CBJn2 (see BJ11, BJ12 or BJ21, BJ22, respectively, in FIG. 2B), whereby a backward jump remains under control of execution control, as denoted by XC in FIG. 2B.

FIG. 2C provides an assembler version of bytecode having a construction as in an embodiment of the present invention. Note that in the pedagogical example of FIG. 3C, many instructions have been removed, for the sake of understanding. The actual assembler instructions are irrelevant to the present invention. Apart from the removed instructions (e.g., instructions from the loop body), the bytecode as illustrated in FIG. 2C is an example of internal representation as the compiler may see it in practice.

More precisely, the depicted bytecode is a double-nested example similar to the diagram of FIG. 2B. In this respect, the first set of instructions starting with the hint for JIT region is similar to R1 in FIG. 2A. The second set after the second region hint is similar to R2, etc., see the non-functional comments after ";;". Similarly, the hints of backwards jumps appear inside each of the regions R2 and R3, consistently with FIGS. 2A and 2B.

The third type of hint annotates a possible transfer of control to the jump location not depicted in FIG. 2A. What the third type of hint actually does and results in shall be better understood in the following detailed embodiment. In this embodiment, the three types of hints evoked so far are relied upon.

First, a region hint starts a region of potential interest to a backend JIT compiler. As said, bytecode starting at the hinted location will be guaranteed to comply with the requirements that all backwards jumps within the region are hinted and forward jumps terminate within the region.

Furthermore, if a cooperating JIT compiler enforces loop termination, preventing infinite looping, any such region will be executed within a compile-time fixed, bounded time. Note that jump targets do not influence run-time bounds.

Optionally, the hint may include details of the JIT region internal structure. The number of hierarchy of loops is of particular interest. If the hint includes the count and maximum depth of loops within the region, compilers may prepare for the hierarchy, or skip down to specific levels such as when resource constraints keep the compiler from operating on the entire region. If loop-hierarchy information is included within the hint, the following additional requirement is met: the number and nesting depth of loops within the region is identical to that included within the hint.

Next, as evoked already, since the JIT-region hint does not replace/annotate any specific instruction, it is simply inserted into the bytecode sequentially. The region hint structure preferably includes the number of bytes or bytecode instructions of the region. Start is implicit, beginning at the instruction immediately following the hint.

Second, concerning the hints that annotate a backwards jump, such hints are inserted immediately before a branch instruction. The compiler will discard the actual instruction and replace it with a call to a virtual machine (VM), allowing rate control even without application cooperation.

The hints may also contain the expected number of iterations, in cases where the optimizer discovers control flow. The VM then may verify that the branch is taken consecutively up to the required number of times, and react to the invalid system state otherwise. One further assumes that such annotation will be inserted, with generic backwards jumps hinted as a special case such as an iteration count reserved for 'unbounded' or 'unknown'.

Note that the backwards jump hint structure may include an expected iteration count, if the optimizer may establish a bound ('unknown' otherwise). The compiler may verify that the next bytecode instruction is a jump, with a jump target earlier in the bytecode stream.

Third, as to the jump target: the corresponding hint annotates a possible, but generally unlikely transfer of control to this location. One example is an exception throw, targeting a particular instruction label. The optimizer may insert these hints if it intends to track exceptional conditions which result in deviations from normal control flow.

The JIT compiler may deposit annotated target locations within its directory of labels (possible jump targets). If it encounters transfer to a known jump target, it may use the stored information to set up the required environment for the jump.

Hints of target of jumps designate entry points within a given one of the regions which is not necessarily exclusively reached by some jump instruction. Furthermore, jump targets are not necessarily within JIT regions (e.g., exceptions are generally outside loops), as JIT regions are ranges in bytecode.

The hint structure here encodes the expected system state, in a particular stack frame structure, at the target location. The jump target is the instruction/label immediately after the hint. Jumps targeting the hint do not need further annotation.

Figure 3:
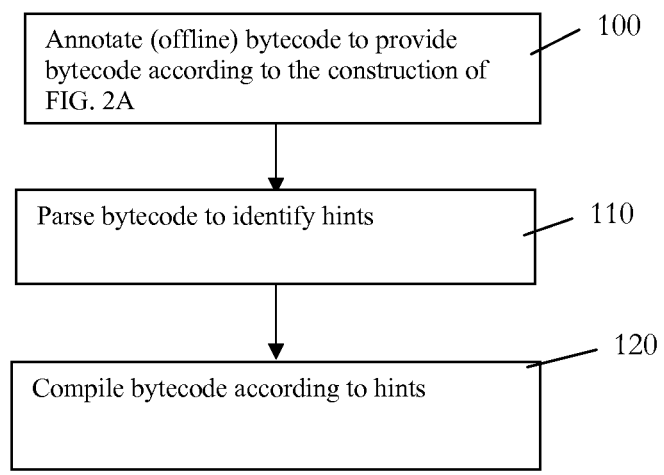
FIG. 3 is a flowchart illustrating a first embodiment of the method according to the invention, using offline annotation of bytecode to obtain a bytecode construction according to the invention.

At present, a few words shall be said as to the method according to the present invention, in reference to FIG. 3. Most generally, this method aims at providing bytecode having a construction as described above. Typically, the method starts with annotating bytecode offline, step 100. Then, in operation, bytecode shall be parsed, step 110, at nodes for identifying hints. Finally, bytecode regions (and more generally bytecode instructions) can be compiled according to the identified hints, step 120.

Hence, a method of annotating executables in a virtual runtime environment in a cooperative fashion is obtained. Annotated bytecode can be interpreted on resource-constrained targets, assuming they implement JIT compilers independently. This method allows bytecode-level hinting, which incidentally can then be customized by the JIT compiler based on runtime capabilities, see below. All hinting is preferably done in a way which allows stream linking on the device. In other words, the JIT compilers can work right on the bytecode as they are received without need of buffering.

As a result, an asymmetric distribution of JIT workload is obtained, where offline optimization exert the largest effort, while resource-constrained targets may process hints with as little as they can afford.

Figure 4:
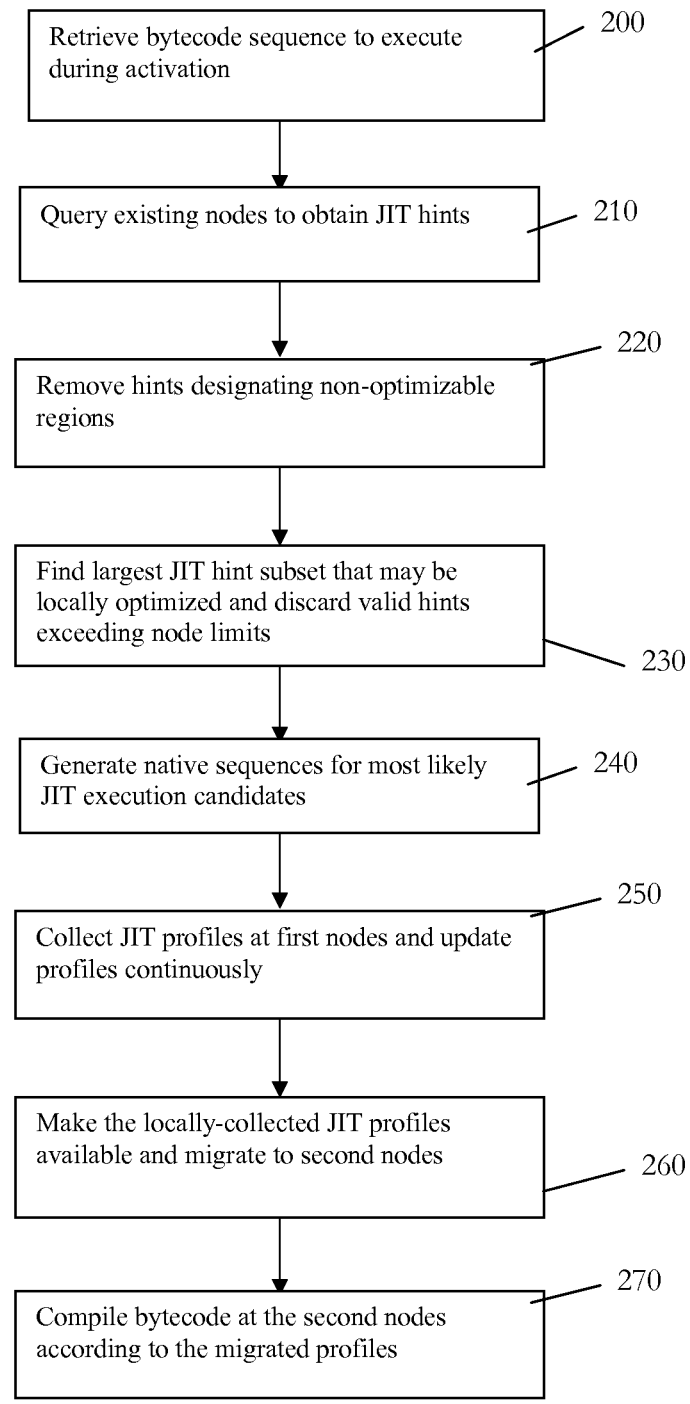
FIG. 4 is a flowchart illustrating a second embodiment of the method of the invention, wherein the JIT hints are relied upon, which are further adapted for instructing the JIT runtime environment to collect statistics about the hints.

According to a second embodiment of the method to be described now in reference to FIG. 4, the hints are furthermore adapted for instructing the JIT environment to collect statistics about the hints.

In operation and most importantly, such statistics are collected (FIG. 4, step 250) at first nodes or instrumentation nodes of the network. Data pertaining to the collected statistics are subsequently made available and migrated from the first nodes to second nodes (step 260). Advantageously then, compilation of the bytecode can occur at second nodes and this, according to the migrated data (step 270). A distributed system is obtained which provides more profile information than any of its constituent nodes, and may be used to provide real-time feedback on system performance.

To achieve this practically, statistics collected may for instance include the following. Statistics as to the first type of hints (regions) may amount to count the number of times when control reaches the region. Concerning the second type of hints (backwards jump), statistics may count the number of times the branch is reached or for conditional branch instructions, the frequency of the branch being taken. As to the third type of hints (target of jump), statistics may count the number of times the target is reached through exceptional control.

The resulting system of nodes may be used to profile workloads with a small number of instrumentation nodes or "first nodes". This system may further allow instrumentation nodes to observe and collect representative JIT patterns, and generate efficient profile feedback, without central management. Such a distributed profiling system is more efficient than traditional, centralized JIT environments, where coordinator nodes distribute code and are responsible for inter-node migration of JIT profiles (and other serialized JIT data, such as native code). Such a system may also allow for per-node tuning of JIT parameters and therefore may be used in a heterogeneous network, or still is well suited for the introduction of future node hardware in the network.

A particularly well suited, detailed embodiment is the following. This embodiment relies on a number of assumptions.

First, it is assumed that nodes share a common runtime environment, that is, a virtual machine as evoked above or, equivalently, the same bytecode abstraction. This makes JIT information portable between nodes. Since optimization occurs based on bytecode-level properties, nodes may feature arbitrary hardware, as long as they feature a native (JIT) compiler for the common bytecode.

Second, it is assumed that nodes share a local network, allowing efficient local communications. As noted earlier, the system migrates only the JIT profiles between the nodes and therefore passes only small amounts of data. Incidentally, it is generally preferred to rely on low latency rather than high bandwidth or on a typical control channel in systems which provide quality-of-service.

Third, although nodes cooperate, trust in other nodes and the bytecode itself is limited. Specifically, it is assumed that information from other nodes or from the bytecode stream ("others") may be corrupt or incorrect. It is further assumed that semantically correct information from others may be trustworthy. The corresponding system may need to detect incorrect bytecode or JIT information, and prevent incorrect operations in its presence. However, correctly formed side information might be accepted, even if it leads to suboptimal performance. In other words, the bytecode generator is allowed to make "bad" optimization decisions.

Note that each node may further discard verified information, for example in the case its resource limitations make it impossible to use in optimizing local JIT properties.

Fourth, the system is best implemented with a cooperating compiler step, to include basic JIT hints within bytecode, as described earlier in details. Delegating this parsing to an offline compiler step further allows for analyzing and optimizing in a resource-friendly environment. Since the JIT hints are only advisory and may be disregarded by nodes, offline-generated hints may not compromise the system except for incorrectly annotated bytecode producing suboptimal performance.

The nodes JIT environment is expected to locally extend JIT knowledge, such that compiler cooperation is not strictly necessary. Hints generated offline, with efficient algorithms, shorten system convergence time.

Fifth, in addition to a per-node JIT environment, a portable representation of JIT meta-information is advantageously used. One may further receive the JIT hints as within the bytecode itself, that is, as produced offline during bytecode creation. One also uses portable, bytecode-level hints as described earlier, generally designating bytecode sequences which are likely candidates for JIT optimization. It is not required to have native JIT information, since nodes may contain different resources, or may even be of completely different architectures. Yet, native JIT data may still be reported, especially in a homogeneous node network, but the system described here works without it.

Sixth, the nodes JIT environment can recognize and ignore incorrect hints, whereby erroneously hinted bytecode can be tolerated. In such a case, JIT hints are discarded. As long as nodes JIT compilers are so tolerant, they may support different subsets of JIT-candidate structures and safely ignore other structures. Therefore, a proper implementation will tolerate future extensions without modification, allowing gradual introduction of more capable nodes, preceded by bytecode with JIT hints useful for the future nodes.

Seventh, in addition to recognizing incorrect or not-applicable hints, the nodes JIT compilers can be designed to ignore JIT hints which conflict with local resource limits or are otherwise not useful locally. This further restriction allows the system to highlight a hierarchical set of JIT candidates (such as multiple loops embedded within each other), and let the node JIT compiler select the one most useful on any particular node. In more generic terms, the system may allow JIT hints to describe globally relevant regions of interest and let nodes select a subset which is the best fit locally.

Eighth, it is assumed nodes will still be able to collect JIT-related information (such as execution profiles) even for bytecode regions that they do actually not optimize. Therefore, this system will be able to optimize based on global profile collection, regardless of how nodes actually optimize bytecode locally.

Detailed implementations would likely follow the following steps during a node's lifetime:

1. Retrieve the bytecode sequence to execute during activation.

2. Query existing nodes, typically locally-connected nodes or nodes with similar architecture/resources, to obtain JIT hints.

3. Preferably, remove hints which designate regions the node's JIT compiler may not optimize, e.g. due to semantic reasons.

4. Preferably, find the largest JIT hint subset that may be locally optimized and discarding valid hints exceeding node limits.

5. Generate native sequences for the most likely JIT execution candidates. This activity could be offline (asynchronous) or coincident with node startup.

6. Collect at first nodes JIT profiles during normal execution, updating execution profiles continuously. This could for instance be implemented as a simple extension of JIT-internal diagnostics.

7. Make the locally-collected JIT profiles available as hints for other, newly connected, or profile aggregator nodes (i.e. the second nodes), and migrate the profiles.

8. Compile bytecode at the second nodes according to the migrated profiles.

In addition to nodes performing the above steps, system-wide information may advantageously be extracted and fed back to global system profile.

Since JIT information is collected across the node network, the system may be implemented with a few logging nodes, which store extended logs within local, persistent storage. While such nodes may have extra resources, not available in typical nodes, they allow an accurate reconstruction of runtime properties. If the logging nodes are placed representatively in the network (or simply randomly distributed), one can assume that the stored runtime data is representative of the actual workload. With representative samples from real workloads, the system allows for full-system profile feedback with modest overhead (additional cost of logging nodes). As a possible extension, one may direct nodes to obtain JIT profiles from a predefined set of nodes.

One may contemplate a system including a network of nodes arranged as in FIG. 1, such as, a shared JIT runtime environment and independently implemented JIT compilers. Such a system includes suitable program code means to implement any embodiment or variant of the method described above. Similarly, the invention is furthermore directed to a computer program product with such program code means.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

For example, a possible extension is to migrate native JIT states between nodes of compatible architectures. Furthermore, 'Knowledge nodes' could even advertise themselves on the network. Essentially, information can be weighted by various information such as its source, log size/resolution where 'knowledge nodes' (e.g., logging nodes) have an advantage.

We claim:

1. A system architecture for maximizing performance of a network of interconnected computing nodes, comprising:
a non-transitory computer-readable storage medium operatively coupled to and communicating with a processor device, the processor device being configured for:
constructing a bytecode configured to maximize performance of wireless sensors in the network of interconnected computing nodes, the bytecode comprising:
at least one region which is a logical sequence of one or more bytecode blocks; and
a region hint embedded in the bytecode, the region hint comprising a bytecode structure configured for instructing a just-in-time (JIT) runtime environment for JIT compilation of a region by JIT compilers implemented at the nodes of the network;
generating and storing, using one or more of the interconnected computing nodes, one or more JIT profiles generated based on the region hint; and
minimizing data transport processing requirements by migrating only the JIT profiles between one or more of the nodes.

2. The system architecture of claim 1, wherein the region hint logically precedes respective regions with respect to processing by the JIT environment, wherein the JIT environment processes the bytecode in a single pass.

3. The system architecture of claim 1, wherein a forward jump from a region terminates within said region.

4. The system architecture of claim 1, wherein the hints are embedded as non-functional instructions for the JIT compiler, such that a target node which lacks JIT compilation can ignore the hints.

5. The system architecture of claim 1, wherein the bytecode is processed in a single pass, and is further annotated with:
backwards jump hints, designed to instruct a dispatch of backwards jumps through the JIT environment; and
jump-target hints which designate an entry point within a given region.

6. The system architecture of claim 5, wherein the bytecode is annotated with:
one or more region hints;
one or more backwards jump hints; and
one or more jump-target hints.

7. A method for maximizing performance of a network of interconnected computing nodes which share a same just-in-time (JIT) runtime environment and which independently implement JIT compilers for compiling bytecode, the method comprising:
constructing a bytecode configured to maximize performance of wireless sensors in the network of interconnected computing nodes, the bytecode comprising:
at least one region which is a logical sequence of one or more bytecode blocks; and
a region hint embedded in the bytecode, the region hint comprising a bytecode structure configured for instructing the JIT runtime environment for JIT compilation of the regions by JIT compilers implemented at the nodes of the network;
generating and storing, using one or more of the interconnected computing nodes, one or more JIT profiles generated based on the region hint; and
minimizing data transport processing requirements by migrating only the JIT profiles between one or more of the nodes.

8. The method of claim 7, further comprising:
annotating bytecode with one or more region hints to obtain the bytecode construction.

9. The method of claim 8, further comprising:
parsing the annotated bytecode in order to identify hints and instruct the compilation of bytecode according to the identified hints, wherein the JIT runtime environment processes the bytecode in a single pass.

10. The method of claim 9, further comprising:
collecting statistics at a first node of the network;
migrating data pertaining to the collected statistics from the first node to a second node of the network;
compiling bytecode at the second node according to the migrated data; and
wherein the hints are further adapted for instructing the JIT runtime environment to collect statistics about the hints.

11. The method of claim 8, wherein the first and second nodes share a local network.

12. The method of claim 9, wherein the first node is an instrumentation node specifically adapted to implement the collecting of the statistics.

13. The method of claim 10 wherein the second node is a node at which collecting statistics is not implemented.

14. The method of claim 10, further comprising compiling at the second node if an execution profile in the data migrated is found to be compatible with the second node.

15. A system for maximizing performance of a network of interconnected computing nodes which share a common Just In Time (JIT) runtime environment and implement JIT compilers for independently compiling bytecode, the network comprising a computer program product comprising a non-transitory computer-readable storage medium having program instructions embodied therewith configured to implement a method comprising the steps of:
constructing a bytecode, stored in a non-transitory computer readable storage medium, configured to maximize performance of wireless sensors in the network of interconnected computing nodes, the bytecode comprising:

at least one region which is a logical sequence of one or more bytecode blocks; and a region hint embedded in the bytecode, the region hint comprising a bytecode structure configured for instructing the JIT runtime environment for JIT compilation of the regions by JIT compilers implemented at the nodes of the network;

generating and storing, using one or more of the interconnected computing nodes, one or more JIT profiles generated based on the region hint; and minimizing data transport processing requirements by migrating only the JIT profiles between one or more of the nodes.

16. The system of claim 15, wherein the network is a heterogeneous network.

* * * * *